United States Patent [19]
Lais

[11] Patent Number: 6,119,392
[45] Date of Patent: *Sep. 19, 2000

[54] SEEDLING GROWTH ENHANCING DEVICE

[75] Inventor: Joseph F. Lais, St. Paul, Minn.

[73] Assignee: Treessentials Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/960,167

[22] Filed: Oct. 29, 1997

[51] Int. Cl.⁷ .......................... A01G 13/10; A01G 17/00; A47G 7/08
[52] U.S. Cl. .................................... 47/23; 47/30
[58] Field of Search .................... 47/23, 30, 17, 47/42, 58, 65.5, 66.1, 66.3, 66.4, 66.5, 86

[56] References Cited

U.S. PATENT DOCUMENTS

| | | |
|---|---|---|
| D. 298,998 | 12/1988 | Hurlstone . |
| 361,241 | 4/1887 | Rugg . |
| 379,948 | 3/1888 | Frantz . |
| 560,966 | 5/1896 | Brown . |
| 645,518 | 3/1900 | Watt . |
| 770,461 | 9/1904 | Haggerty . |
| 1,031,941 | 7/1912 | Lanham . |
| 2,056,136 | 9/1936 | Hyatt . |
| 3,218,759 | 11/1965 | Barrons . |
| 3,384,992 | 5/1968 | Heffron . |
| 3,816,959 | 6/1974 | Nalle, Jr. . |
| 3,826,040 | 7/1974 | Roberts et al. . |
| 3,828,473 | 8/1974 | Morey . |
| 4,068,421 | 1/1978 | Marovich ................................... 52/80 |
| 4,248,014 | 2/1981 | Williames ................................... 47/86 |
| 4,333,264 | 6/1982 | Smrt . |
| 4,596,106 | 6/1986 | Kunczynski . |
| 4,699,347 | 10/1987 | Kuhnley . |
| 4,711,051 | 12/1987 | Fujimoto . |
| 4,899,486 | 2/1990 | Hurlstone . |
| 4,922,652 | 5/1990 | Graves . |
| 4,995,191 | 2/1991 | Davis ........................................ 47/32 |
| 5,433,030 | 7/1995 | Lehman .................................... 47/32.1 |
| 5,497,894 | 3/1996 | Krupa et al. . |
| 5,509,229 | 4/1996 | Thomasson et al. ...................... 47/21 |
| 5,590,805 | 1/1997 | Knoss et al. . |
| 5,605,008 | 2/1997 | Johnston et al. .......................... 47/21 |
| 5,613,320 | 3/1997 | Thomasson et al. ..................... 47/32.1 |
| 5,653,345 | 8/1997 | Knoss et al. . |

FOREIGN PATENT DOCUMENTS

| | | |
|---|---|---|
| 227225 | 3/1958 | Australia ................................... 47/30 |
| 000653935B | 10/1994 | Australia ................................... 47/23 |
| 0 186 344 | 7/1986 | European Pat. Off. . |
| 0 230 767 | 8/1987 | European Pat. Off. . |
| 0 325 490 | 7/1989 | European Pat. Off. . |
| 0 664 078 | 7/1995 | European Pat. Off. . |
| 0 699 381 | 3/1996 | European Pat. Off. . |
| 824473 | 7/1936 | France ...................................... 47/23 |
| 000459672A | 12/1991 | France ...................................... 47/30 |
| 2 666 958 | 3/1992 | France . |
| 000490620A | 6/1992 | France ...................................... 47/23 |
| 2 753 341 | 3/1998 | France . |
| 0025881A | 2/1977 | Japan ....................................... 47/32.1 |
| 132134 | 9/1919 | United Kingdom ..................... 47/32.1 |
| 2104366A | 3/1983 | United Kingdom ................. 47/30 OT |
| WO8701904 | 4/1987 | United Kingdom ....................... 47/23 |
| WO 96/02125 | 2/1996 | WIPO . |

OTHER PUBLICATIONS

Treessentials Company, "Supertube Clipper" brochure, 1995.

Tree Sentry, "Now the newest generation is here! Introducing the Tree Sentry tree shelter" pricing and order form.

Primary Examiner—Michael J. Carone
Assistant Examiner—Fredrick T. French, III
Attorney, Agent, or Firm—Merchant & Gould P.C.

[57] ABSTRACT

A seedling growth enhancing device is disclosed which takes the form of an elongated tubular shell formed from three shell segments each having a radius of curvatures less than the effective radius of curvature of the tubular shell. The device is thermoformed from thermoplastic and includes a flexible hinge joining two common edges of the three shell segments. The third common edges are formed with male and female snapping members enabling the device to be formed around a seedling and snapped into place.

14 Claims, 5 Drawing Sheets

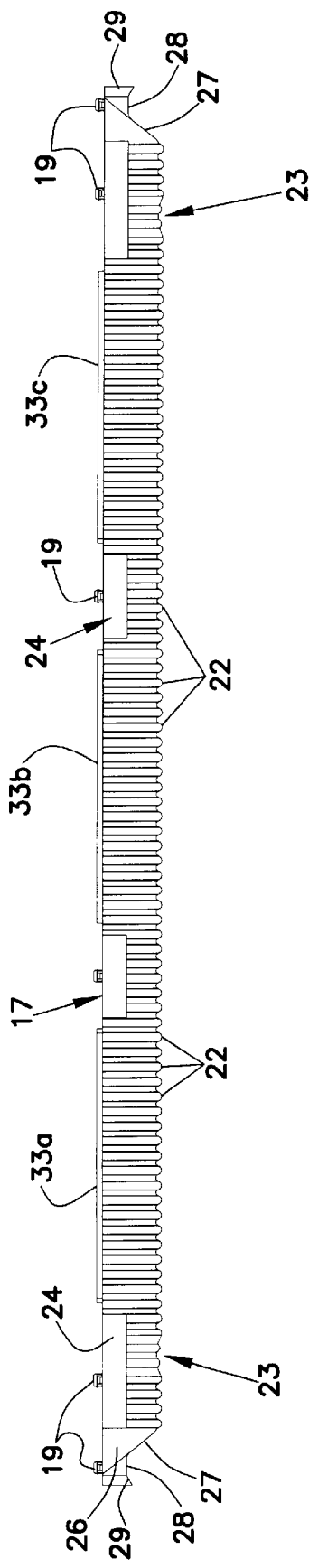
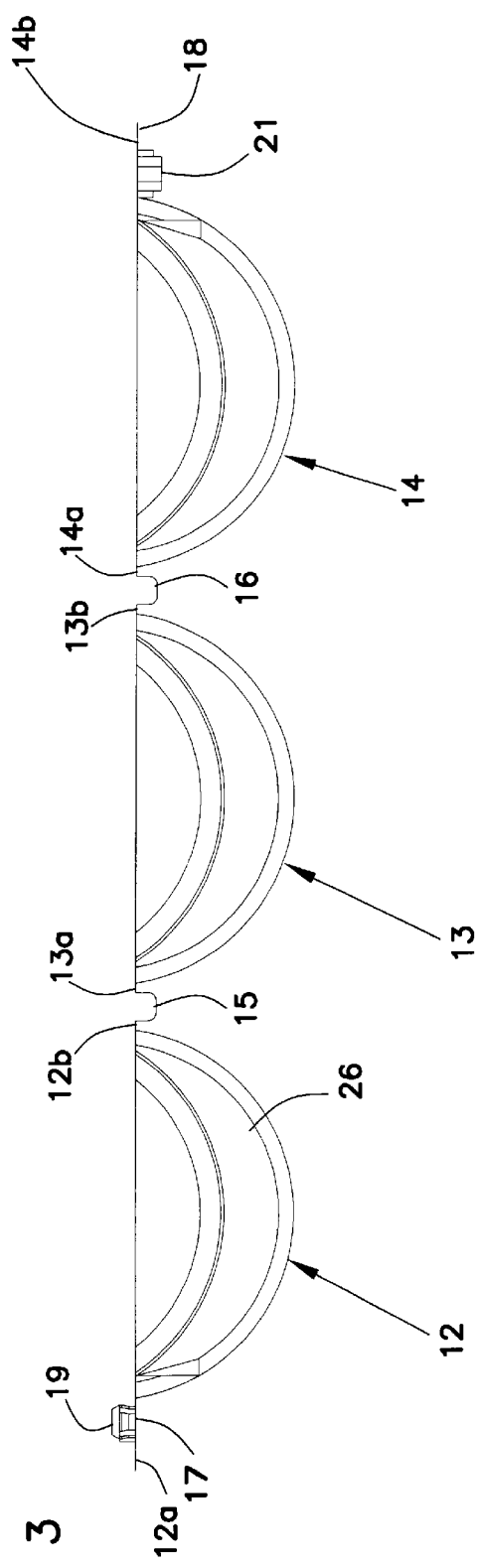

SEEDLING GROWTH ENHANCING DEVICE

BACKGROUND OF THE INVENTION

The invention is directed to devices for enhancing the growth and form of plant seedlings.

Within the past two decades, plant seedling growth enhancers (hereinafter referred to as "grow tubes") have been developed and used to assist newly planted seedlings to survive and grow at an enhanced rate and improved form during the early stages after planting. Seedling growth enhancers have found their greatest application to date in the forest industry, but have also been advantageously applied to other types of seedlings such as grape vine seedlings.

Conventional grow tubes are made by extruding thermoplastic into a desired profile and cutting the extrusion to desired lengths. This is a satisfactory approach to manufacture provided the profile is a configuration capable of being extruded, such as cylindrical grow tubes. However, it is not possible to extrude profiles that are nonlinear (i.e., those having other than straight longitudinal lines) or those having complex or other irregular configurations.

In the recent past grow tubes have been manufactured by thermoforming, in which a blank sheet of thermoplastic is placed over a mold or between mold halves, brought to temperature and then forced against the mold, such as by vacuum or compression between the mold halves. Using this method, irregular and nonlinear configurations having different advantages may be obtained.

Since grow tubes are typically cylindrical in form, the conventional approach using thermoforming is to mold them in split cylindrical halves and either fasten the halves along both pairs of adjacent edges, or to form a continuous hinge along one common edge and to fasten them at the opposite edge in clam-shell fashion.

There are a number of disadvantages with this approach, not the least of which is the amount of "draw" of the thermoplastic blank sheet into the mold. Stated otherwise, in order for the grow tube to be of a useful diameter, the split halves have a depth corresponding to at least the radius of the tube, requiring a relatively deep draw of the blank thermoplastic sheet. This can cause problems with formation of the desired configuration as well as over thinning of the material itself.

Another problem with this conventional approach is the lack of stiffness in the resulting grow tube, which adversely affects its stability in the field. In other words, the sides of a grow tube manufactured in this manner may be excessively flexible and/or subject to being pushed in when installed or in use.

The inventive grow tube is a result of an endeavor to utilize thermoforming while at the same time producing an improved structure that will stand up to the rigors of installation and use as well as to perform advantageously in enhancing seedling growth. We have found that these objectives may be attained by thermoforming a grow tube that has at least three segmented sides or lobes, preferably with each of the sides or lobes having a radius of curvature that is less than the effective radius of curvature of the tube itself. Stated otherwise, each of the individual lobed segments is arcuately formed and actually defines a concave recess relative to the effective radius of curvature of the tube itself. This represents an advantage from the standpoint of thermoforming because the depth of each of the lobed segments is less than the depth of a half cylinder. Further, the lobed approach actually creates additional volume within the grow tube based on the radius of curvature of each of the lobed segments, giving the plant more room to grow.

In addition, the use of at least three lobed segments produces a grow tube that is more easily installed around an existing seedling. In the preferred embodiment, the three lobes are joined by a continuous integral hinge along two common edges, and fastening means are molded on the remaining edges enabling the device to easily be snapped into place in surrounding relation to a seedling. The use of at least three lobed segments with integral hinges also ensures that the fastening means will be in alignment as the free edges are brought together for fastening. Further, providing a releasable common edge or seam enables the grow tube to be installed around seedlings having growing branches or a larger crown without damage, as occurs when a closed cylindrical grow tube is installed by insertion over the top of the seedling.

The fastening means preferably are releasable and take the form of integrally molded snaps spaced along the two opposed open edges. This is not only advantageous from the standpoint of assembling and installing the grow tube in the field, but also permits access to the seedling as it grows for maintenance purposes. Specifically, one or more of the releasable snapping means in the middle of the grow tube may be unsnapped, and the opposing edges thereafter spread apart to gain access to the seedling. This does not otherwise disturb the grow tube itself or its stable installation.

With at least three joined common edges, the grow tube has superior strength and rigidity based on the fact that its fundamental cross sectional construction is that of a triangle. This rigidity is enhanced by tapering each open end inwardly and coupling this with a reversed flange. The reversed flange on the lower end is placed on top of the ground with earth in surrounding relation to the seedling mounded around it. The reversed flange on the upper end of the tube prevents abrasion to or cutting of the seedling as it grows beyond the top of the grow tube.

In addition, each of the lobed segments is formed with a plurality of tightly spaced corrugations that extend transversely to the axis of the grow tube. These corrugations provide additional stiffness, and also give rise to a faceted inner surface that serves to reflect external light received into the tube, reflecting and scattering it multidirectionally to optimize light exposure to the seedling.

The fact that the grow tube of the preferred embodiment includes three lobed segments rather than two gives it the inherent strength of a triangle, providing stiffness as well as resistance to collapse from external forces. As a result, the installed grow tube fully protects the seedling it surrounds with strength and stability, prevents damage to the seedling by animals, sprayed herbicides and the like, and creates an internal microenvironment that enables the seedling to grow and flourish in its early stages of formation.

BRIEF DESCRIPTION OF THE DRAWINGS

FIG. 2 is a side elevational view of the seedling growth enhancing device in flattened and nonassembled form;

FIG. 3 is an enlarged end view of the seedling growth enhancing device in flattened and nonassembled form;

DETAILED DESCRIPTION OF THE PREFERRED EMBODIMENT

Figure 4:
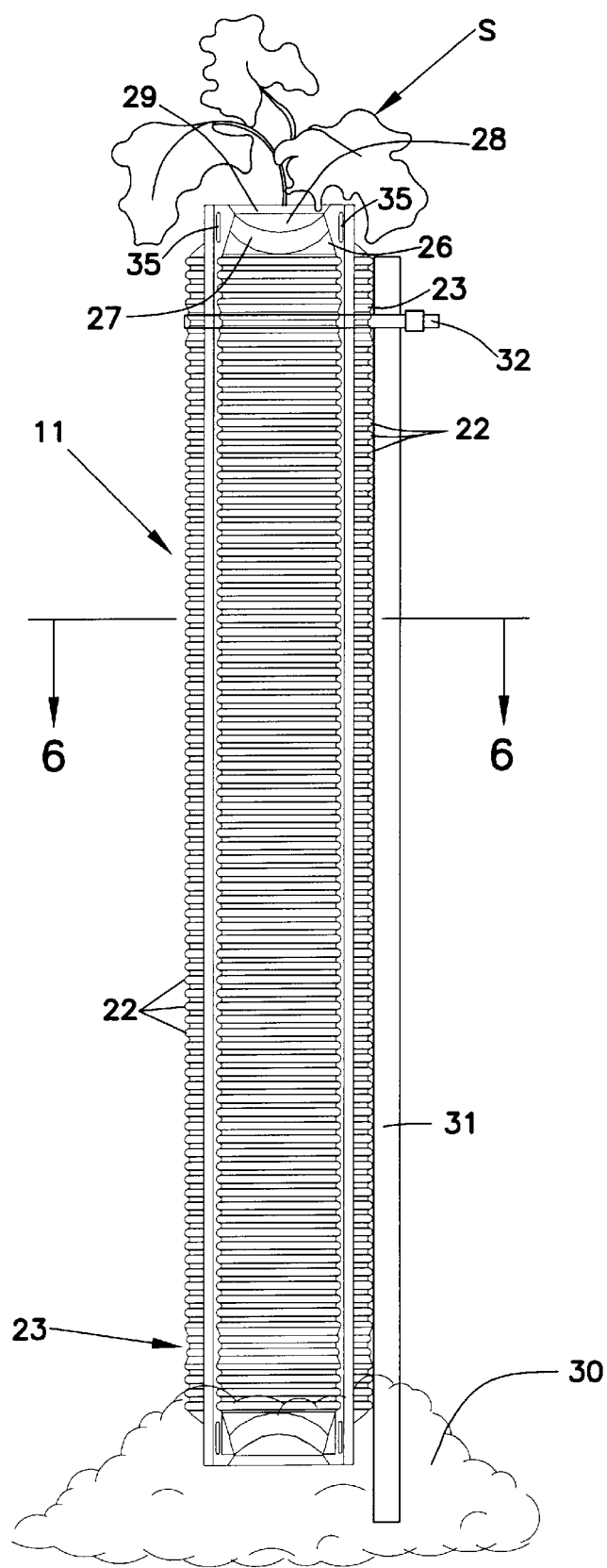
FIG. 4 is a view in side elevation of the seedling growth enhancing device in an upright, assembled form and installed over a seedling.
Figure 5:
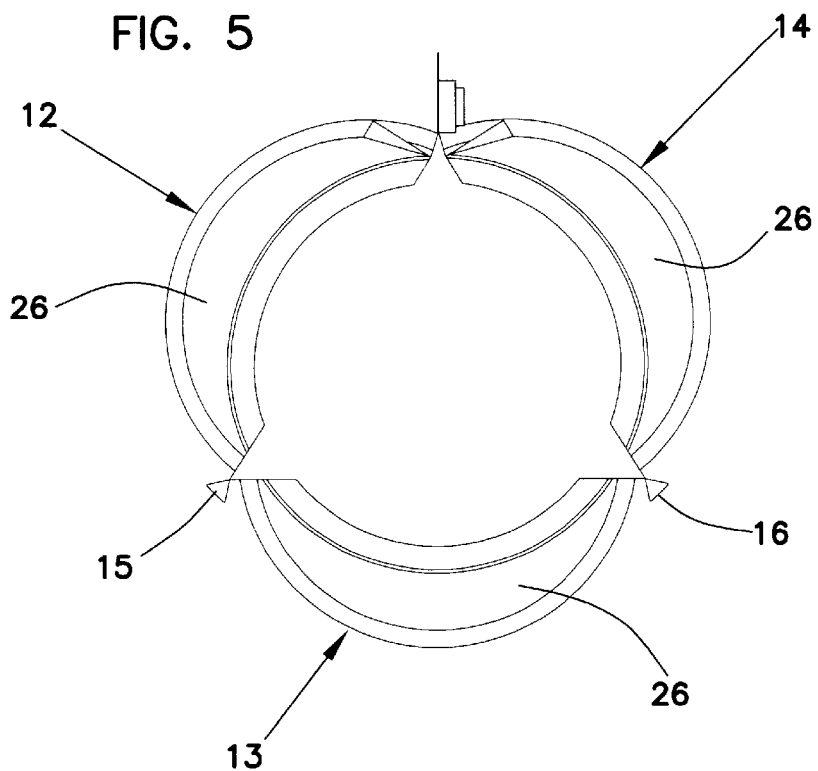
FIG. 5 is an end view of the seedling growth enhancing device in assembled form.
Figure 6:
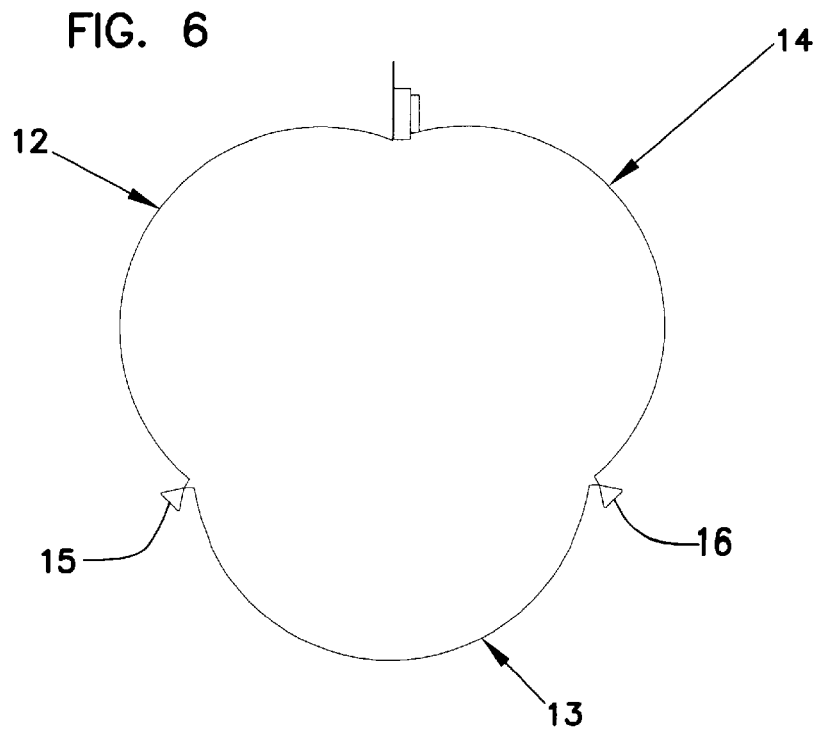
FIG. 6 is an enlarged diagrammatic transverse sectional view of the seedling growth enhancing device taken along the line 6—6 of FIG. 4.

With reference to FIGS. 1–6, a seedling growth enhancing device, hereinafter referred to as a "grow tube", is represented generally by the numeral 11. As shown in FIGS. 4 and 6, grow tube 11 generally takes the form of an elongated tubular shell of predetermined length or height sufficient to enclose at least a portion of a seedling S FIG. 4. Preferably, grow tube 11 is made by thermoforming from a thermoplastic material which is non-opaque; i.e., it is translucent or transparent and therefore capable of transmitting light to the seedling. Preferably, the thermoplastic composition used for grow tube 11 resists ultraviolet light and is capable of being used and reused over a significant period of time.

With specific reference to FIGS. 4–6, grow tube 11 comprises an elongated tubular shell which is open at the top and bottom and which is generally circular in cross section.

Figure 1:
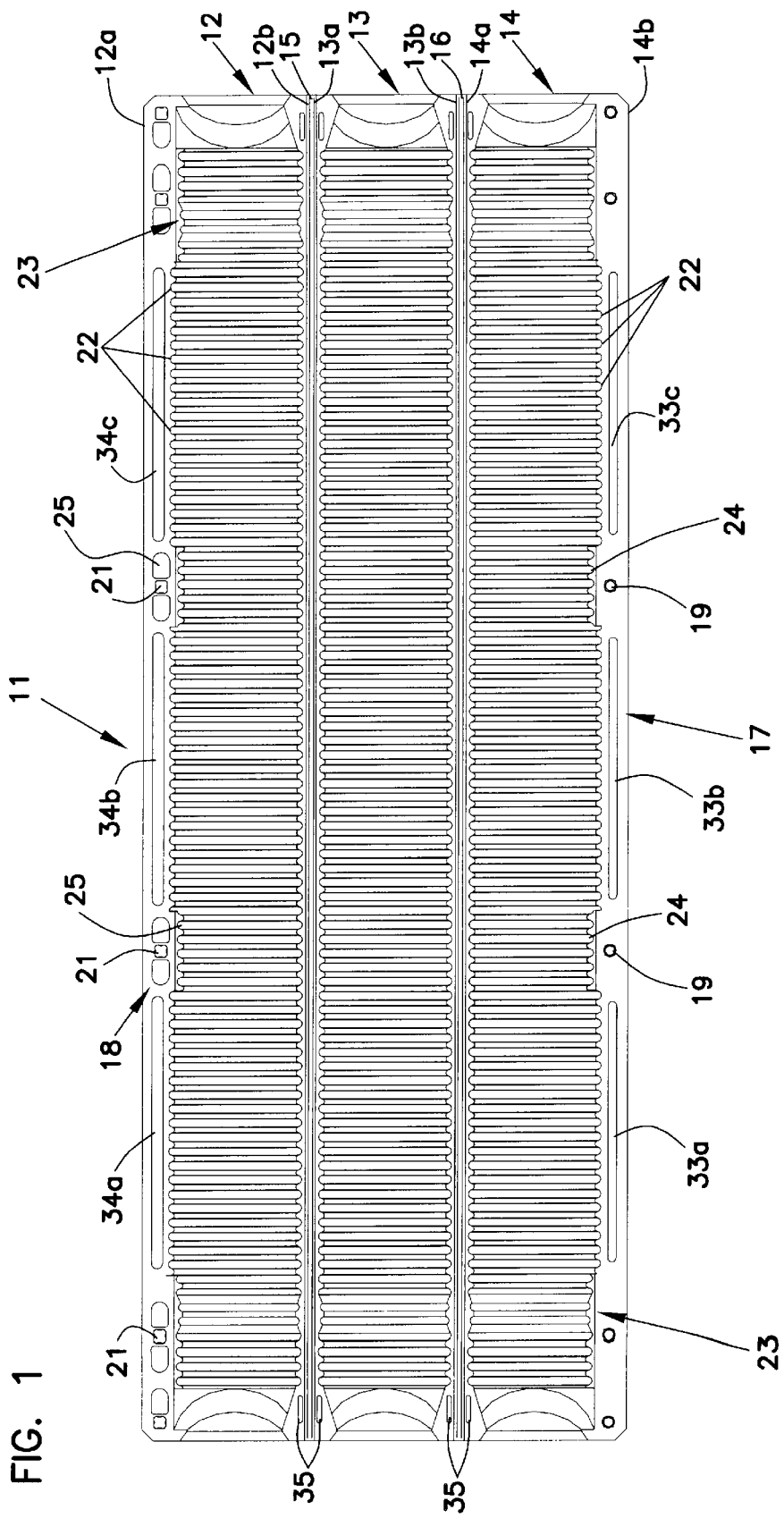
FIG. 1 is a top plan view of a seedling growth enhancing device embodying the invention in flattened and nonassembled form.

With reference to FIGS. 1–3, grow tube 11 comprises first, second and third elongated shell segments 12–14 each of which defines parallel elongated edges 12a–b, 13a–b, 14a–b, respectively. The adjacent edges 12b–13a and 13b–14a in the preferred embodiment are molded together with continuous, flexible hinges 15, 16, respectively (FIGS. 1 and 3). As particularly shown in FIG. 3, the hinges 15, 16 are constructed to provide flexure of the elongated shell segments 12–14 relative to each other when the grow tube 11 is assembled in tubular form.

Longitudinal edge 12a is defined by a longitudinal flange 18 (FIGS. 1 and 3) that extends horizontally outward as viewed in FIG. 3. Similarly, elongated edge 14b is defined by a longitudinal flange 17 that also extends horizontally outward. The flanges are flexibly joined to the associated sides enabling them to mate in a flush relationship when they are brought together in assembled form (see FIGS. 5 and 6).

The underside or inner face of flange 17 is provided with a plurality of male fastening members 19 that are spaced over its length (see FIGS. 1 and 2). The underside or inner face of flange 18 is formed with a like plurality of female fastening members 21 that are spaced in opposition to the male members 19. In the preferred embodiment, there are six fastening member pairs 19–21, two at each end of grow tube 11 and two spaced in the middle.

Figure 7:
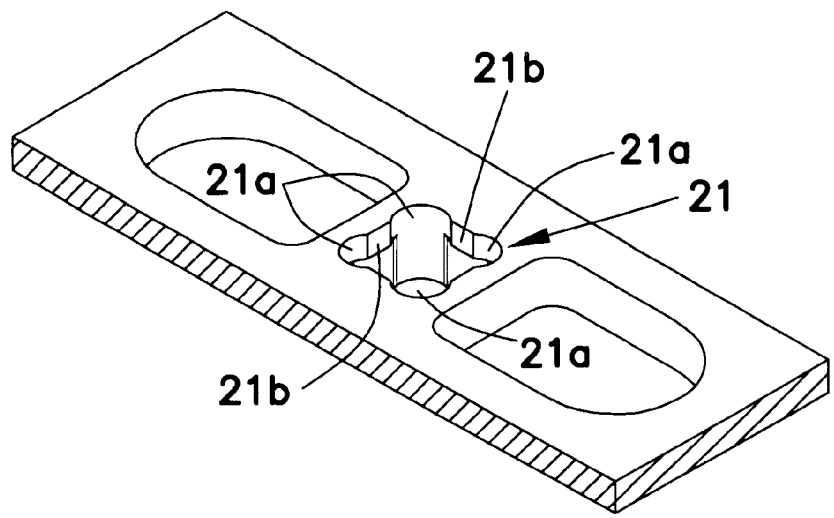
FIG. 7 is an enlarged fragmentary perspective view of the female portion of a fastening means for the seedling growth enhancing device.
Figure 8:
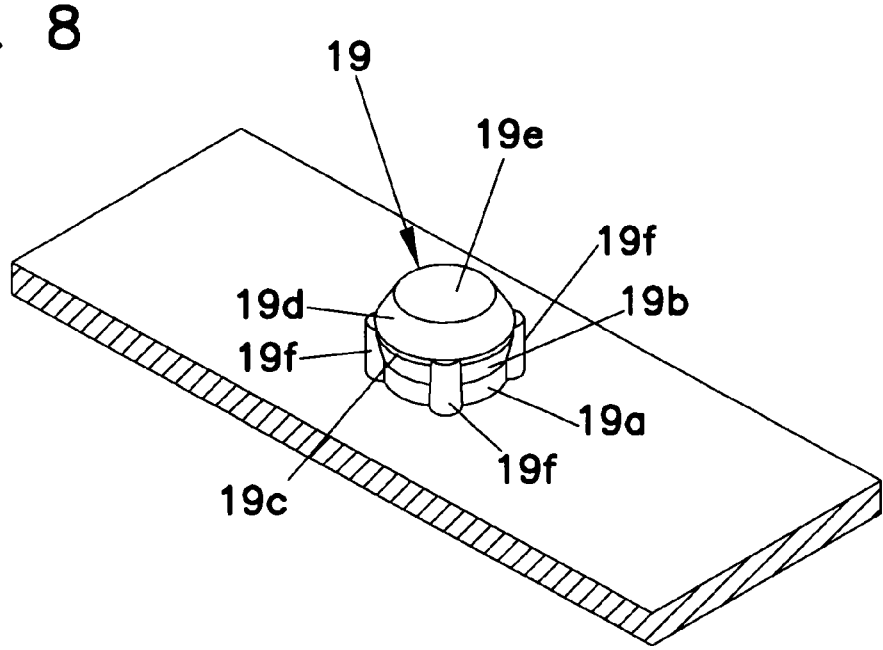
FIG. 8 is an enlarged fragmentary perspective view of the male portion of the fastening means.

The specific configuration of the male/female fastening means 19, 21 is shown in FIGS. 7 and 8. Male fastening member 19 (FIG. 8) comprises a pedestal 19a that is generally cylindrical. An outwardly tapered frustroconical surface 19b projects upward from pedestal 19a and terminates in a peripheral edge 19c which represents the maximum diameter of member 19. Projecting above the edge 19c is a reverse or inwardly tapered frustroconical surface 19d that terminates in a flat top surface 19e.

Four corner pillars 19f are equiangularly spaced around the surfaces 19a, 19b, terminating at the peripheral edge 19c.

With reference to FIG. 7, the female fastening member 21 comprises a substantially square receptacle with enlarged rounded corners 21a. Between the respective rounded corners 21a are ledge surfaces 21b. The transverse dimension between the ledge surfaces 21b is less than the transverse dimension (diameter) of the peripheral edge 19c of male fastening member 19.

The male fastening member 19 is in essence a round peg that fits in the square hole of the female fastening member 21. This is facilitated by the tapered surface 19d, which helps to guide initial entry of the member 19 into the member 21. Thereafter, the four pillars 19f are alignably guided into the rounded corners 21a. The point at which the peripheral edge 19c forcibly passes beyond the four ledge members 21b defines a detent or snapping relationship, at which point the male fastening member 19 is captured within the female fastening member 21. This is a releasable interlocking relationship, and the male fastening member 21 may be removed as facilitated by the tapered surface 19b as the fastening member 19 is forcibly moved in a reverse direction, which causes the members 19, 21 to become unsnapped.

With reference to FIGS. 1 and 2, longitudinal flange 17 is formed with three elongated projections 33a, 33b, 33c that are respectively disposed between the male fastening means 19. Complementing receptacles 34a, 34b, 34c are formed in opposition on flange 18 between the respective female fastening means 21. When the flanges 17, 18 are brought together, projections 33a–c alignably fit into the receptacles 34a–c as the various fastening pairs 19, 21 are snapped together. This not only adds additional longitudinal rigidity to the joined flanges 17, 18 and the grow tube 11 as a whole, but also creates a tortuous path from the outside environment to the internal microenvironment of grow tube 11. This significantly decreases the possibility that sprayed herbicides will enter the grow tube 11 through the seam.

With continued reference to FIGS. 1–3 and 5–6, each of the elongated shell segments 12–14 is lobe-shaped; i.e., each has an arcuate cross section with a radius of curvature that is less than the effective radius of curvature of the grow tube 11 (i.e., the radius of curvature as measured at the hinges 15, 16). In other words, the inner surface of the grow tube 11 is not cylindrical, but rather consists of concave segments extending between the respective longitudinal edges 12a,b, 13a,b and 14a,b. This produces a greater internal volume for the seedling than, for example, a cylindrical tube the maximum radius of which is at one of the hinges 15, 16.

Each of the lobed segments 12–14 is formed with a plurality of corrugations 22 that are transverse to the longitudinal axis of the tube 11 and generally equidistantly spaced over its length. The corrugations 22 in the preferred embodiment define an internal surface that is the complement of and substantially the same as the external surface; i.e., it is ribbed or corrugated. From the internal standpoint, these corrugations 22 serve to reflect light in a multidirectional manner, ensuring that a seedling is provided with diffuse light throughout the day to maximize its growth. Often conventional grow tubes define a cylindrical inner surface that is less effective in diffusing light.

With specific reference to FIGS. 1, 2 and 4, the corrugations 22 are slightly inwardly recessed in an area proximate each end of each lobed segment 12–14, as represented at 23. These recessed areas 23 indicate the position for and also retain a tying device that secures the grow tube 11 to a stake 31 (see FIG. 4).

In addition, recessed areas 24 are formed in the corrugations 22 immediately adjacent the male fastening means 19, and similar recessed areas 25 are formed immediately adjacent the female fastening means 21 (see FIGS. 1 and 2). These recessed areas 24, 25 permit easier access to the fastening means 19, 21 enabling them to be more easily grasped during the assembling procedure.

With continued reference to FIGS. 1–5, each of the lobed segments 12–14 terminates at each end in a non-corrugated, axially extending surface 26 that is truncated by an inwardly angled surface 27 that takes the form of an arcuate segment. Extending axially upward from the angled surface 27 is an arcuate surface 28 that leads to outwardly projecting angular flange 29 that extends circumferentially around, and with the flange 29 of the other lobed segments, defines each end of grow tube 11. These straight, tapered and flanged surfaces significantly increase the rigidity of each end of the grow tube 11 in its assembled form. In addition, the reversed or negatively angled flange 29 prevents abrasion to or cutting the seedling as it grows upwardly out of the grow tube 11.

With reference to FIGS. 1 and 4, tie apertures 35 are formed in each end of the lobed segments 12–14 in opposed pairs. The apertures 35 are elongated to simplify the threading of tying material therethrough. As best shown in FIG. 1, elongated apertures 35 are formed in each end of the parallel elongated edges 12b, 13a, 13b and 14a. Neither of the longitudinal flanges 17 or 18 includes such openings.

In use, an unassembled grow tube 11 is brought to the site of a seedling. Because its fabricated form is substantially flat and open, the grow tube 11 is simply placed on one side of the seedling S, formed into a tube by bending the lobed segments 12–14 relative to the flexible hinges 15–16, and then snapped together through the use of the paired fastening members 19–21. It will be noted that the orientation of grow tube 11 (as to up or down) is not of significance because it is structurally the same in either position. At this point in the assembly and installation, the lower end of grow tube 11 is placed onto the ground, and as shown at FIG. 4, earth 30 is mounded around its base a distance of up to about one and one half inches, although this may vary under the circumstances. This stabilizes the grow tube 11 and prevents relative movement at the base.

Preferably, a stake 31 is driven into the ground immediately adjacent the grow tube 11, and the tying device 32 is wrapped around the upper recessed area 23 and the stake 31 and secured. The tying device may be tape, string or a plastic tying device having a quick lock as shown. In this manner, both the top and bottom of the grow tube 11 are stabilized, protecting the seedling and providing a microenvironment in which it may grow and flourish.

Alternatively, a stake having a top at least as high as the grow tube 11 may be used in conjunction with ties that are threaded through a selected pair of the opposed elongated apertures 35 and then tied to the stake.

One of the primary advantages of using releasable fastening means 19, 21 and spacing them as shown is to permit access to the seedling S during its growth for maintenance; e.g., to prune the seedling as necessary, remove weeds that may have begun to grow and to treat the seedling for disease or insect infestation.

This is easily accomplished by unsnapping either or both of the snapping pairs 19, 21 at the middle of grow tube 11 and spreading the opposed edges apart to the extent necessary for pruning or other maintenance. In addition, the fact that all of the snapping pairs 19, 21 are releasable permits the grow tube 11 to be completely disassembled, removed from a seedling that has grown to the extent that grow tube protection is no longer necessary, and reused on a younger seedling.

Thermoforming the grow tube also enables the use of a structural configuration that permits a number of grow tubes to be nested together in the open or flattened form for packaging or shipping. Grow tubes 11 may also be taken directly into the field in this nested packaging form, adding to the convenience of installation.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A seedling growth enhancing device comprising:
   an elongated tubular shell having a substantially circular cross-section and an effective radius of curvature, said elongated tubular shell comprising:
   first, second, and third elongated shell segments, each shell segment being formed from translucent material into an elongated wall of singular thickness having first and second elongated edges, the elongated shell segments forming an open topped elongated tube when joined edge to edge, and wherein each of said shell segments has a radius of curvature which is less than the effective radius of curvature of the elongated tubular shell;
   hinge means for flexibly joining the first longitudinal edge of the first and second shell segments to the second longitudinal edge of the second and third shell segments, respectively; and
   releasable fastening means for releasably fastening the first longitudinal edge of the third shell segment to the second longitudinal edge of the first shell segment to define said elongated tubular shell.

2. The seedling growth enhancing device defined by claim 1, wherein each end of each of said shell segments terminates in an inwardly angled surface and an outwardly projecting angular flange.

3. The seedling growth enhancing device defined by claim 2, wherein the outwardly projecting angular flanges of the respective shell segments together form a circumferential flange defining the end opening of the elongated tubular shell.

4. The seedling growth enhancing device defined by claim 1, wherein the fastening means comprises a plurality of male fastening means disposed on the second longitudinal edge of the first shell segment and a like plurality of female fastening means disposed on the first longitudinal edge of the third shell segment in opposition to said male fastening means, the male and female fastening means being constructed and arranged for releasable interlocking relation.

5. The seedling growth enhancing device defined by claim 4, wherein the male and female fastening means interlockably engage in snapping relation.

6. The seedling growth enhancing device defined by claim 5, wherein the second longitudinal edge of the first shell segment and the first longitudinal edge of the third shell segment each comprises a longitudinal flange member of predetermined width, the male and female fastening means being respectively formed in said flange members.

7. The seedling growth enhancing device defined by claim 6, which further comprises a plurality of elongated projecting members formed in one of said longitudinal flanges and a like plurality of complementing receptacles formed in the other of said flanges, the projecting members and receptacle mutually engaging in alignable relation when the male and female fastening means are snapped together.

8. The seedling growth enhancing device defined by claim 1, wherein each of said shell segments is formed with a plurality of corrugations that are transverse to the longitudinal axis of the elongated tubular shell.

9. The seedling growth enhancing device defined by claim 8, wherein said corrugations are substantially perpendicular to the axis of the elongated tubular shell.

10. The seedling growth enhancing device defined by claim 9, wherein said corrugations are circumferentially recessed approximate each end of the elongated tubular shell to facilitate tying to a support stake.

11. The seedling growth enhancing device defined by claim 9, wherein said corrugations are recessed adjacent the releasable fastening means to facilitate access thereto.

12. The seedling growth enhancing device defined by claim 1, wherein each of said shell segments is formed from thermoplastic.

13. The seedling growth enhancing device defined by claim 12, wherein the respective shell segments are thermoformed into an open, unassembled structure capable of being manually formed and assembled into said elongated tubular shell.

14. The seedling growth enhancing device defined by claim 13, wherein said open, unassembled structure is configured to permit nesting with like structure.

* * * * *